United States Patent [19]
Leitz et al.

[11] 3,972,021
[45] July 27, 1976

[54] SYSTEM FOR MONITORING SPACES BY ELECTRO-OPTICAL MEANS

[76] Inventors: Ludwig Leitz, Laufdorferweg 33; Knut Heitmann, Lerchenweg 16; Eckart Schneider, Lauerstr. 3, all of 633 Wetzlar, Germany

[22] Filed: May 21, 1975

[21] Appl. No.: 579,568

[30] Foreign Application Priority Data
May 27, 1974 Germany............................ 2425466

[52] U.S. Cl............................ 340/38 P; 340/19 R; 340/32; 340/44; 340/258 B; 340/267 R; 340/279; 250/237 G
[51] Int. Cl.² .......................................... G08G 1/00
[58] Field of Search................ 340/32, 38 P, 258 B; 250/237 G, 221, 222

[56] References Cited
UNITED STATES PATENTS
3,436,540  4/1969  Lamorlette........................ 340/38 P

*Primary Examiner*—Thomas B. Habecker
*Attorney, Agent, or Firm*—Gilbert L. Wells

[57] ABSTRACT

System for monitoring spaces by electro-optical means, using optical imaging means (1) capable of detecting objects present in the monitored spaces and beam splitting means (2) for grating resolution of the object images into geometric, mutually complementary components. The imaging and beam splitting means form a correlation imaging sensor system equipped with photoelectric detectors (4,5) for the purpose of separately converging light fluxes corresponding to the image components into analogue electrical signals, and electrical means for measuring the amplitudes and phases of the signals as well as their variations. The correlation sensor system analyzes these values with respect to presence and/or motion of objects within the monitored spaces.

16 Claims, 8 Drawing Figures

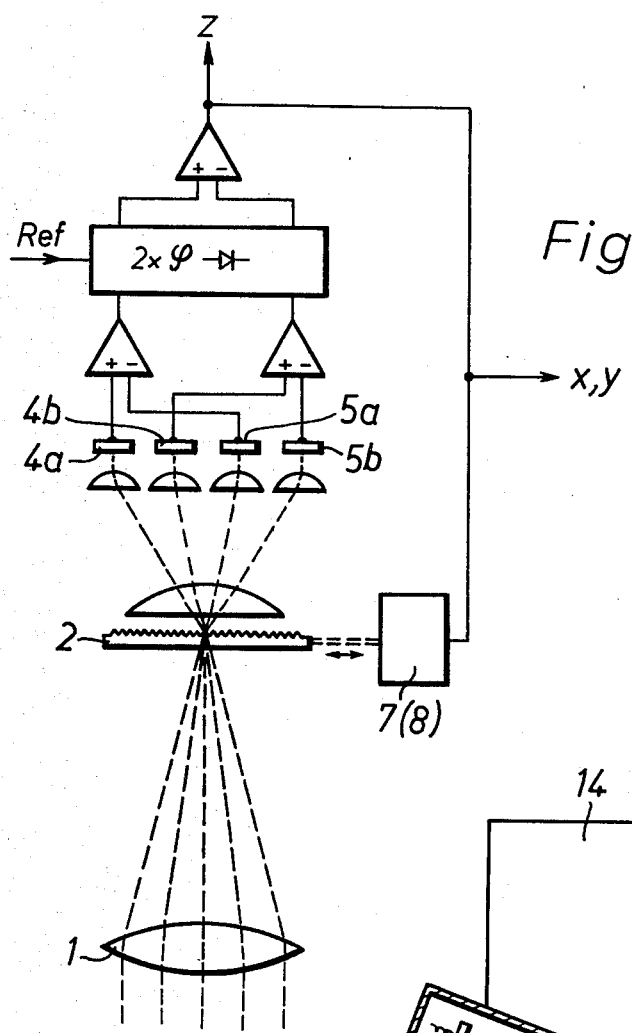

SYSTEM FOR MONITORING SPACES BY ELECTRO-OPTICAL MEANS

CROSS-REFERENCE TO A RELATED APPLICATION

Applicants claim priority under 35 U.S.C. 119 for Application P 24 25 466.8, filed May 27, 1974 in the Patent Office of the Federal Republic of Germany.

BACKGROUND OF THE INVENTION

The present invention relates to systems for monitoring spaces by electro-optical means.

Electro-optical correlators useful in the present invention are disclosed in U.S. Pat. Nos. 3,781,110; 3,856,400 and 3,856,401, the disclosures of which are incorporated herein.

Various systems are already known for monitoring spaces. There are electrostatic, electromagnetic, mechanical, electro-mechanical and optical methods operating on the principle of light barriers. One of the drawbacks of the electrical methods consists in their susceptibility to interference by strong electrical errors from external sources. Electrostatic equipment in enclosed rooms is sensitive to changes in the rooms and must be readjusted each time. This electrostatic equipment is also affected by atmospheric humidity, particularly as regards open areas. Methods to date for traffic monitoring make use of copper loops inserted into the traffic path, the induction fields of which are affected by metal, such as iron, in the vehicles. These devices suffer from the drawback that only restricted spaces may be monitored and their installation requires tearing up the surface of the traffic path. Humans and animals on sidewalks or on the traffic path are not detected. Furthermore, vehicles are detected only when they contain metal. This may be a source of difficulty in the future when there is wider use of plastics. Electro-mechanical switches as used underneath mats for the automatic closing of doors suffer from the drawback of a break in the floor, difficult and costly installation, and unfavorable cleaning. Since a system, not part as a unit of automatic door and elevator control, is used, it is complex in installation. Light barriers only monitor restricted spaces which at best are two-dimensional and comprise gaps and which are sensitive to drift. German Pat. No. 663,931 discloses an electro-optical sensor with a spatial frequency filter, which detects motion. This instrument suffers from the drawback that it may be spuriously affected by lights and shadows projected into the space being monitored. Furthermore, it fails to detect motion toward the optics. It also fails to record whether there is occupancy of a space being monitored unless there be detectable measurement of a body penetrating this monitored space.

German Pat. No. 663,931 further discloses the feasibility of ascertaining the direction of motion by means of a spatial frequency filter the scanning frequency of which is varied over the image field. This, however, entails three drawbacks:

a. ascertaining the direction of motion is feasible only if the object covers only part of the image field so that the increase or decrease in frequency unambiguously discloses the direction of motion;

b. ascertaining the direction of motion is only satisfactorily feasible if a constant motion of the object is expected, since for instance a very quickly accelerating object produces the spurious effect of the opposite direction; and c. a varying scanning frequency is obtained only by trading against the signal constancy and hence signal quality (see L. M. Biberman, "Reticles in Electro-Optical Devices," Pergamon Press, London 1966).

SUMMARY OF THE INVENTION

Having in mind the limitations of the prior art, it is an object of the present invention to detect objects stationary or moving in fairly large areas and three dimensional space, for instance in a street, and regarding the direction of the movement to determine the proper sign. Regarding stationary objects, the system of the present invention responds provided the objects attain a certain height or a certain spacing above a surface, for instance a traffic path, a floor, or a wall.

Therefore, the system of the present invention is characterized by optically imaging means detecting objects present in monitored spaces, and by beam splitting means for grating resolution of the object images into mutually geometrically complementary components, this imaging and beam splitting means forming an image correlating sensor system. This image correlating sensor system comprises photoelectric detectors for the separate conversion of the light fluxes corresponding to the image components into analogue electrical signals, and further electrical means for measuring signal phase and amplitude and their variations, and for analyzing these values with respect to the presence and/or motion of the objects within the spaces.

A special advantage of the system of the present invention with respect to the state of the art of space monitoring consists in that three dimensional spaces are subdivided by means of a subdivision of the sensor image divider into sub-spaces of varying alarm intensity, or of varying importance, or of different functions. The system further allows ascertaining the traffic density and the traffic direction as well as traffic flow and makes use of this information for logic control. This is feasible both for traffic flows filling the entire field of view and for accelerating objects, as for instance cars driving off. These advantages are applied to controlling street traffic, elevator doors and people gathering at elevators and for detecting motion toward a source of danger. A sensor connected to the frame of an elevator door is a practical assembly unit.

BRIEF DESCRIPTION OF THE DRAWINGS

The present invention is best described below by means of the preferred embodiments shown diagrammatically in the drawings, wherein;

FIG. 5 is a detailed plan view in cross section of a further embodiment of a traffic sensor useful in the present invention;

FIG. 6 is a schematic plan view of the image correlating system of the present invention;

DESCRIPTION OF THE PREFERRED EMBODIMENTS

Figure 1:
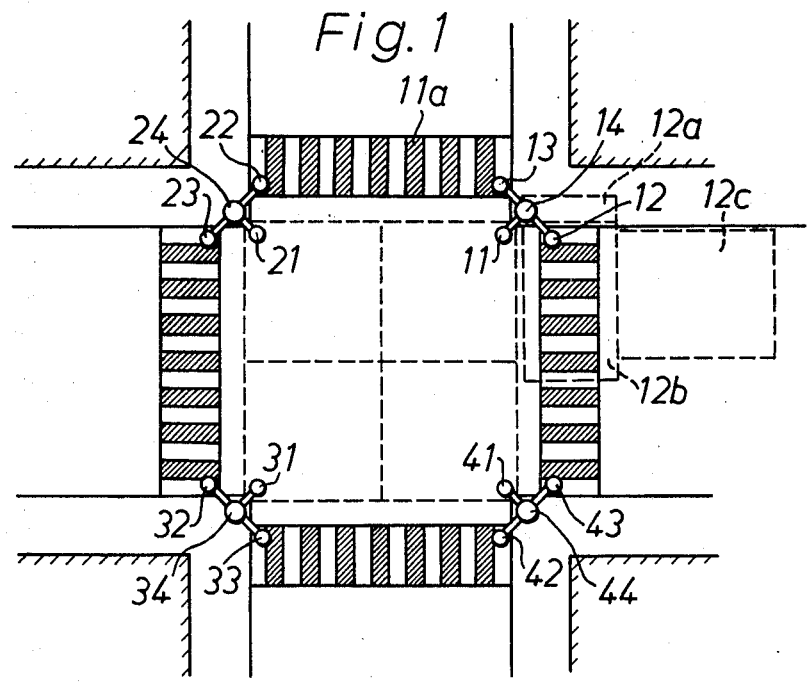
FIG. 1 is a top plan view of a traffic control for street crossings.

In principle, the sensors of the correlation system of the present invention with the spatial frequency filter for the purpose of determining the z-axes may be represented in different ways. For instance, they can comprise two objectives and two spatial frequency filters, or one objective and one spatial frequency filter whereby corresponding to a pupil division the imaging perspectives differing in parallax being analyzed separately. Said sensors may further comprise an arrangement of only one objective and spatial frequency filter together with projector projecting raster or grating lines onto that surface which in turn is imaged by the sensor correlator onto a moving spatial frequency filter. In the first case, only the relative motion is of significance. In the second case, the base required for detecting a z-axis is formed between the axis of the projector and the optical axis of the optical detector correlator. In this second case too a parallax, namely the one between the correlator objective and the projector the parallax angle of which is varying according to object distance, is used to measure distances by employing a moveable grating for analyzing the phase relationships of the correlator output signals originated in the correlator plane corresponding to the superposition of the grating or projected lines onto the object. However, raster or grating line projections and grating or line imaging may also take place through a common objective, provided one pupil half is used for projection and the other one for imaging, the parallax base being reduced in a manner commensurate with the size of the measuring range.

Preferably the correlation sensor with a single objective and pupil division is used in many cases because of the compact and simple design. It is shown diagrammatically in FIG. 6. The objective has reference numeral 1, the prismatic grating has reference numeral 2. The latter is provided either with simple prismatic grooves or with a pyramid geometry depending on the object structures being analyzed only for the x-direction or for both x- and y-directions. The grating or gratings are moved correspondingly along one axis only by drive 7 or along two axes by drives 7/8.

The moving spatial frequency filter alternatingly deflecting the light from the object image points onto the sets of detectors 4a, 4b or 5a, 5b is the prismatic grating 2. Subscripts a and b correspond to the particular beams of the right and left entry pupil halves. The signals from 5a and 4a are combined and operate in push-pull relationship, as is also the case for those from 5b, 4b. By coupling these signals with a feedback from the drive signal for drives 7 and 8, which in a particular embodiment are piezo electric oscillators, the signals are phase related, and this phase relationship facilitates obtaining the position determining signals along axes x, y and z.

Figure 7:
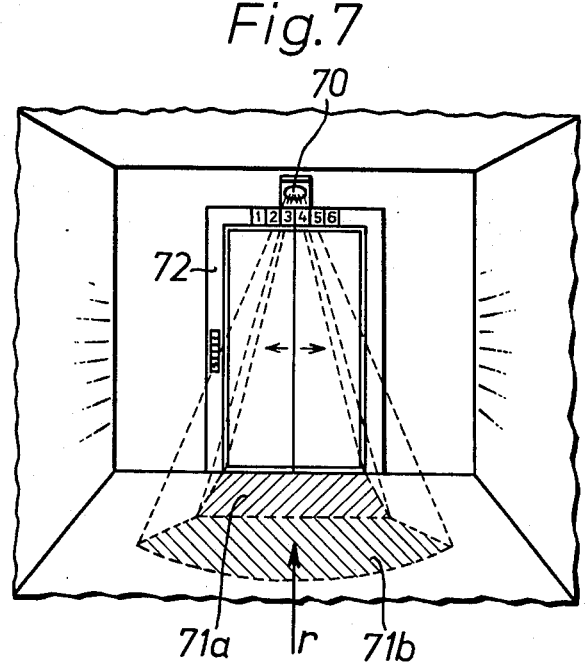
FIG. 7 is a perspective view showing an application of the present invention to elevators.
Figure 8:
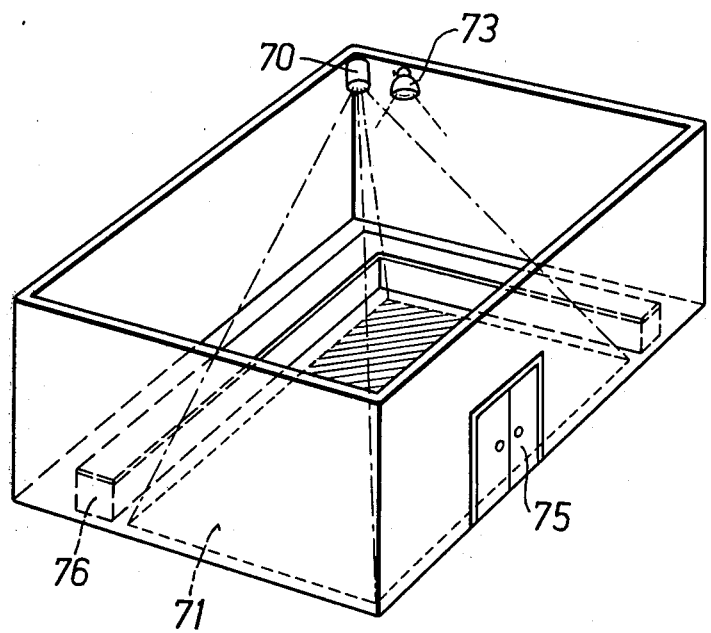
FIG. 8 is a perspective view showing an application of the present invention to counter rooms.

The phase relationship is so set by means of a given circuit that a surface, for instance floor 71 of FIG. 8, or floor sections 71a, 71b of FIG. 7 is adjusted for 180° phase difference or cancellation. Objects or persons entering this sensor covered space alter the null interference and cause a signal distinctly above the zero level.

When the system of the present invention is used to monitor street traffic, the sensors are mounted above the traffic path so that they image both pedestrian and vehicular traffic. Preferably the sensors are mounted on the traffic light poles above the traffic lights. The function of the correlators is to register motions in particular segments being monitored, for instance at road segments, crossings and also at waiting stations of sidewalks. For executing this function the correlators are employed individually and combined in groups. They are also designed in a manner that they can detect occupancy of a region above the street or road and also evacuation motions taking place in this area.

Therefore, the correlators may monitor several hundred meters of a street line for incoming and outgoing vehicles regardless of several vehicles, if any, being parked in this line. Similarly, pedestrian motion is monitored and for opening the street for vehicle traffic the clearing of the striped crossings from pedestrians can be ascertained. By means of correlators adjusted for a range above the roadway, street crossings and spaces ahead of the traffic signals are monitored for being free of vehicles or not, for instance in case of accident or malfunction. Refinement of the system of the present invention for instance by enlarging the measurement base by the insertion of rhombic prisms, permits to detect pedestrians who are prone in the striped crossings because of accident in the form of an object lying on the traffic path, and to control the traffic accordingly. The present invention contemplates feeding all the signals to a computer preferably controlling traffic only at a single crossing or at most including a few adjacent ones, because as a rule different traffic segments require individual control. The correlation sensors of the present invention, such as disclosed in U.S. Pat. Nos. 3,781,110; 3,856,400 and 3,856,401 are so designed that their fields of view are divided into segments equipped with pairs of photocell matrices. Therefore, the monitoring of several street segments by means of a single objective in order to count vehicles or persons for the purpose of logical traffic control is practicable.

Figure 2:
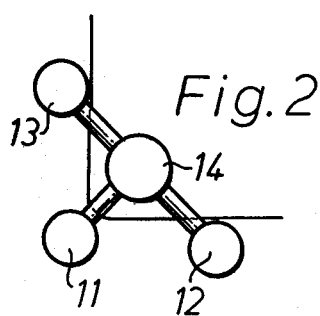
FIG. 2 is a detailed showing of a traffic light pole of FIG. 1 in top plan view.
Figure 3:
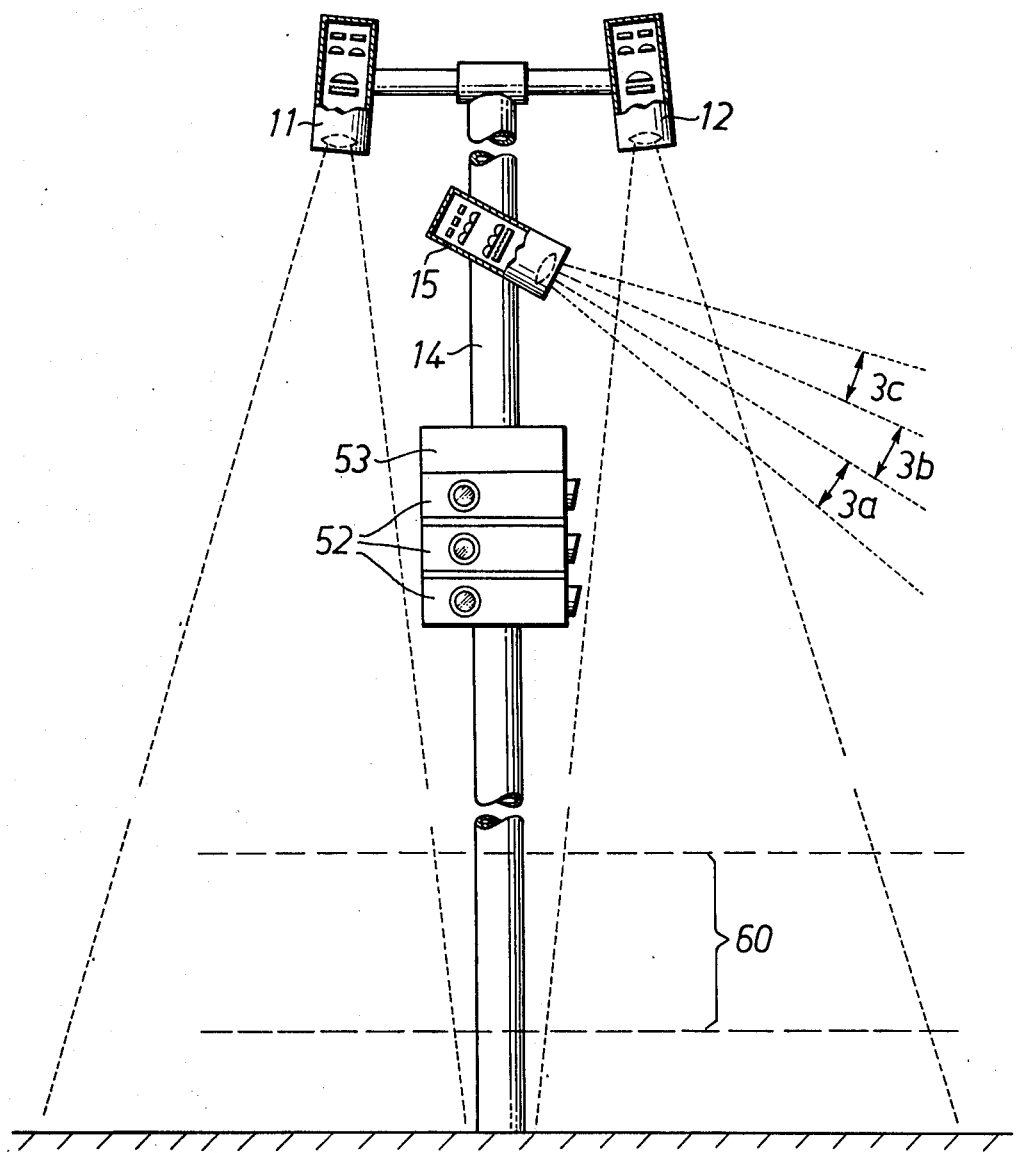
FIG. 3 is a side plan view of a traffic light pole of FIG. 1.

The instrumentation of the present invention is discussed by means of a traffic control for one street crossing. FIG. 1 is a top plan view of a street crossing with four traffic light posts 14, 24, 34, 44, FIG. 2 is an enlargement of the top plan view of traffic light post 14, showing correlators 11, 12, 13 mounted on this post. FIG. 3 shows the arrangement of correlators 11, 12, 15 and traffic lights 52 and computer 53 at pole 14 in elevation. The computer 53 usefully employed in the present invention is disclosed in U.S. Pat. Nos. 3,057,071; 3,799,679; 3,788,749, and 3,711,200.

Optical correlators 11, 12, 13 (FIG. 1) and corresponding sets 21, 22, 23; 31, 32, 33; and 41, 42, 43, for instance, are so adjusted for the plane of the traffic path that the push-pull signals will interfere to zero for instance, for a phase difference of about 180°, while objects emerging in the range of zone 60 of FIG. 3 generate a signal clearly deviating from zero. In order to detect these object planes well, the imaging objectives and spatial frequency gratings subtend angles meeting the Scheimpflug (focusing) conditions where in this condition the planes of objects, objective and image intersect in one line.

Correlator 11 monitors surface 11a of the crossing rectangle shown in dashed lines within the adjustment range 60 of FIG. 3. Correlator 12 is set for the segment 12a, which is the pedestrian waiting area on the sidewalk, for segment 12b which is the striped pedestrian crossing for the purpose of pedestrian monitoring, and for 12c for monitoring the vehicle waiting area. All of these areas are shown in dashed lines. Correlator 15 is less steeply inclined with respect to the traffic path than correlators 11, 12, 13 and is used to monitor several successive traffic path segments. It is subdivided for instance into image sections 3a, 3b and 3c. In this manner the approach of vehicles is signaled to the computer. If the segments are correspondingly subdivided, object counting takes place. Speed too is ascertained. Vehicles approaching the traffic signal at once receive green light when the other traffic path segments are known to the computer to be clear.

FIG. 5 shows an embodiment for a correlator 15a, 15b allowing switching the traffic lights to "transit" for approaching ambulances, fire engines or police vehicles equipped with blue flashing lights in addition to the function described in connection with 15. In this embodiment, correlator component 15a assumes the tasks ordinarily filled by 15. Correlator 15b is equipped with a radiation filter 25 in the form of a chromatic splitting mirror reflecting blue and making a decision depending on three criteria: blue light (through a filter), low light frequency corresponding to the spectral width of flashing, higher frequency corresponding to the angular velocity of the vehicle and grating periods of the spatial frequency filter 2b.

This frequency selection takes place by means of the spatial frequency filter combined with electronic frequency sifters.

The combination of the three criteria to provide priority ensures that the vehicle emitting the blue flashing light is not be parked or standing on the traffic path being monitored for marking an accident. For that reason light filter system 25 similarly aims to eliminate vehicles flashing yellow lights.

Combining correlators 15a and 15b in one unit essentially derives from utilizing the same optics 1. Obviously the two correlators may be mounted separately.

Furthermore the combination of the previously conventional copper loop electric field/traffic path monitoring with the optical correlators for purposes which only are executable by the latter ones (as there are monitoring pedestrians and recognition of light signals) is practicable.

Figure 4:
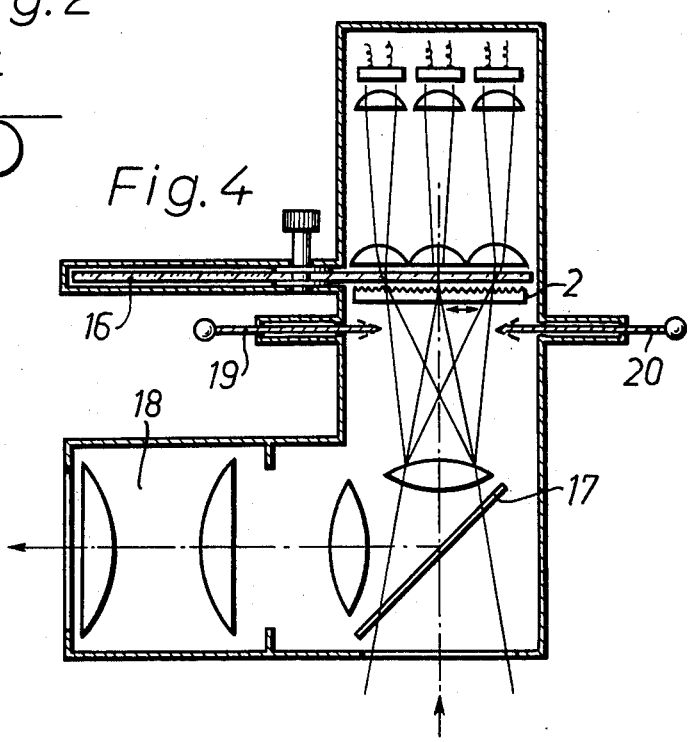
FIG. 4 is a detailed plan view in cross section of a traffic sensor useful in the present invention.

In order to allow a basic setting of the sensors at the site of their mounting, the present invention proposes that the pairs of photocell matrices be designed to be detachable, pivotable or displaceable and further may be replaced by an adjusting optics; or else, an autocollimating system as in FIG. 4 is mounted in front of the objective, consisting of a splitting mirror 17 and a viewing telescope 18 combined with an opaque surface 16 which is inserted to the rear of image plane 2 for the purpose of reflecting the light back into autocollimating system 17, 18.

Adjustable stops 19 and 20 are slightly out of focus ahead of the image plane. They cover image parts of the object space that should be omitted from monitoring.

FIG. 7 shows the application of the system of the present invention to elevator control, both for affecting door opening and the ordinary passenger gathering.

Sensor 70 is combined with door frame 72 in a favorable assembly unit. It is aimed at front area 71a. The sensor image field with corresponding spatial frequency gratings and detection matrices is split as fields 71a and 71b into subdivided segments.

A single monitored field 71a suffices for a simple representation. However, additional monitoring of field 71b allows greater facility.

A functional description of the simple representation of FIG. 7 is given below:

Sensor 70 has been adjusted in the manner described for the basic setting with respect to surface 71a, so that the clear floor results in a signal level approximately zero. When persons necessarily of some size enter the front, then the front is considered as occupied and the elevator control is signalled. An elevator equipped with gathering control and passing by sensors stops only when the front is occupied. This eliminates the drawback of unnecessary elevator stops in the case that waiting persons in the meantime used another elevator or changed their minds.

Parallax setting and setting of the phase related signal level are such that objects of slight height, for instance dogs, cartons, boxes and suitcases are rejected with respect to signal generation.

The elevator closes only when surface 71a is free from humans according to sensor recording. This eliminates the well known drawback of automatic doors closing precisely during the entry of a person into the elevator because of the failure of the conventional light barrier to register such imminent entry.

The proposed equipment of the present invention should practically replace to the widest extent a courteous elevator operator. The additional subdivision 71b serves that end too. An "occupied" signalling system is associated with this segment related to a corresponding signalling sector in the subdivided correlation sensor, there being one direction of signalling for one axis pointing to the elevator. If a person in field 71b moves in radial direction r towards the elevator, then even if field 71a reports no presence, there will be a delay of the electrical release, for instance by an inserted capacitor, for a short time, until both fields report being clear. Motions transverse to the r-direction will not be recorded. This effect is obtained by the grating provided as the spatial frequency filter in the image plane of the correlation sensor being trued so that only image motions in the direction of the r-axis pass transversely over the grating edges within field 71b, the electronic setting being so selected that only a minimum frequency corresponding to ordinary walking speed triggers a control signal.

FIG. 8 shows an application of sensor 70 to a bank exchange room. A door is referenced by 75, a counter by 76 and the floor space viewed by the sensor by 71. Surface 71 simultaneously is the basal plane of the spatial pyramid shown in dot-dash lines encompassed by the sensor. An infra red lamp 73 is used for night lighting and 73 may also be an infra red raster projector.

It is observed that moving shadows or lights caused by moving trees, vehicles and persons or lightning and penetrating through glass door 75 or through windows and imaging on floor 71 generate no signals because the sensor phase setting also is at the null level for that plane. Discrimination of insects or stray birds is obtained as well by amplitude as frequency and speed respectively. These remarks apply equally to all other applications of space monitoring, also to traffic control, for instance to shadows and lights on the street. When the space bounded by the pyramid over floor 71 is entered when the sensors are energized, then a control signal is generated.

It is contemplated that the present invention can be used to control traffic at a few neighboring traffic junctions by using a computer which is fed all the output signals from the correlation systems. Such a computer and computer program as disclosed for instance in U.S. Pat. No. 3,711,200 are not described in detail as any of a wide variety of conventionally known computing devices may be readily programmed to perform the computations useful in traffic controlling.

In the embodiment of FIG. 8, the correlation system of the present invention is useful to activate alarm systems, recording systems, photographic systems and closure systems by the intermediary of electrical means. The electrical means and the systems are disclosed in U.S. patent application Ser. No. 37,611, filed May 15, 1970.

With the embodiment of FIG. 7, a suitable device showing the electrical means activating people-gathering controls and mechanisms for closing and/or opening doors are disclosed in Siemens-Zeitschrift 46 (1972) Heft 11, pp. 844–849.

The present invention may be applied to safety measures regarding machines and facilities by using the sensors to safeguard a 3D potentially dangerous space by signalling penetrations into same and by actuating alarm systems and/or shutting off the machinery or facility and/or inserting a protective system. Alarm systems and systems suitable for shutting off the machinery or facility and/or inserting a protective system are disclosed in Siemens-Zeitschrift 44 (1970) Heft 4, pp. 261 and 262.

We claim:

1. In a system for monitoring spaces by electro-optical means, the improvement comprising:
   optical imaging means (1) for detecting objects present in said spaces to be monitored and beam splitting means (2) for grating-resolution of images of said objects into geometric, mutually complementary components, said imaging and beam splitting means defining an imaging correlation sensor system having photoelectric detectors (4, 5) for separately converting light fluxes corresponding to components of said images into analogue electrical signals and electrical means for measuring signal phase and amplitude and their variations, and for analyzing said signals with respect to the presence and/or motion of said objects within said spaces.

2. The system of claim 1, wherein said optical imaging means and said photoelectric detectors are adjusted for given distances and given solid angles for the purposes of monitoring.

3. The system of claim 1, wherein said optical imaging means (1) have exit pupils with different pupil parts and said photoelectric detectors (4, 5) are mounted in said exit pupils for sensing said different pupil parts separately.

4. The system of claim 1, having means for periodically moving said beam splitting means in at least one direction and for generating reference signals proportional to said motion.

5. The system of claim 1, having analyzing means determining the distance between said objects and said sensor from the relative phases of the signals appropriate to the various pupil parts and ascertaining the sign and magnitude of a transverse object motion from comparison of the phases and frequencies of said signals and said reference signals.

6. The system of claim 2, having a stop arrangement (19, 20) located in the plane of said beam splitting means (2) for covering given image parts.

7. The system of claim 1, having said optical means (1) with the principal planes intersecting the plane of said beam splitting means (2) and an object plane of interest in a straight line.

8. The system of claim 1, used for traffic monitoring, having at least two of said optical correlation sensor systems each comprising one grating in one image plane and at least one of said photoelectric detectors and generating electrical signals containing directional information, based on the movement of the grating or on the beam splitting of optical elements said correlation sensor systems mounted above a traffic path for sensing the traffic of vehicles and the traffic of pedestrians crossing the road.

9. The system of claim 8, wherein said correlating sensor systems are mounted on the traffic light poles above the traffic lights.

10. The system of claim 8, having a computer receiving all the output signals from said correlation sensor systems and controlling traffic at a given number of neighboring traffic junctions.

11. The system of claim 8, wherein said correlation sensor systems have gratings which are subdivided into segments with associated photoelectric detectors for separately monitoring different street segments being detected by said imaging means.

12. The system of claim 8, having said correlation sensor systems monitoring the traffic path along several segments for incoming flow and having optical spectral filtering and electronic frequency sifting for sensing a moving blue flashing light vehicle and actuating switching means providing said vehicle with priority by means of computer controlled traffic lights.

13. The system of claim 1, for monitoring the safety of people and objects, having said optical means (1) and said photoelectric detectors (4, 5) which are adjustable to three-dimensional spaces inside or before said objects and which upon the entry of objects into said spaces activate electrical means following said photoelectric detectors for activating surveillance systems.

14. The system of claim 11, used for monitoring spaces before elevator enclosures, said electrical means activating doors of said elevator enclosures.

15. The system of claim 14, for controlling said elevator doors, said correlation sensor system controlling door closing divided into two measurement sectors, one for signalling the presence of persons in the segment near the door and the other one for recording persons moving towards the elevator in a segment farther away by means of a corresponding orientation of the spatial frequency filter grating and for transmitting the information of said movement to a logic circuit for controlling said door closing.

16. The system of claim 1, used for safety measures in machines and facilities safeguarding a 3-D potentially dangerous space by signalling penetration(s) into same and by actuating protective systems.

* * * * *